Patented Sept. 22, 1931

1,824,686

UNITED STATES PATENT OFFICE

BERNHARD RICHARD, OF BASEL, SWITZERLAND, ASSIGNOR TO J. R. GEIGY S. A., OF BASEL, SWITZERLAND

MANUFACTURE OF MONOAZO-DYESTUFFS

No Drawing. Application filed June 7, 1930, Serial No. 459,836, and in France July 4, 1929.

This invention is an improvement in or modification of that described in the specification of the patent application Ser. No. 397159, filed October 3, 1929.

In that specification there is described a manufacture of new monoazo-dyestuffs by combining a diazo-compound of an aryl or aralkyl ether of ortho-aminophenol or a substitution product thereof with an N-arylsulpho-derivative of a 1-amino-8-naphthol-disulphonic acid. The dyestuffs thus obtained dye wool and silk extremely clear red shades very fast to light and fulling, and they are soluble in water with red to blue-red and in concentrated sulphuric acid with violet to blue coloration.

By the present invention dyestuffs which are analogous to those obtained by the process of the aforesaid specification are made by combining a diazo-compound of an aryl or aralkyl ether of ortho-aminophenol, or of a substitution product thereof, with an acidyl-1-amino-8-naphthol-disulphonic acid instead of with an N-arylsulpho-derivative of a 1-amino-8-naphthol-disulphonic acid.

The new dyestuffs obtained in this manner resemble in quality and tint those which have been described in the aforesaid specification, giving red to blue-red tints very fast to light and fulling.

The following examples illustrate the invention:

Example 1

19.9 kilos of ortho-aminophenyl-orthotolyl-ether are diazotized in the usual manner. The diazo-solution is poured while stirring, into an aqueous solution of 39.6 kilos of 1-chloracetyl-amino-8-naphthol-3:6-disulphonic acid and 40 kilos of crystallized sodium acetate. The solution is progressively neutralized by addition of a solution of sodium carbonate. After some hours the coupling is complete and the whole is filtered and the solid matter dried. The dyestuff thus obtained is a red powder. It dissolves in water to a red-blue solution and in concentrated sulfuric acid to a red-brown solution. It dyes wool and silk a very clear blue-red tint which is very fast to light and to fulling.

In its free form the dyestuff of this example has most probably the following formula:

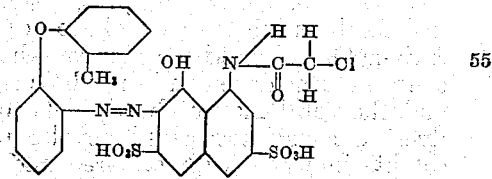

In this example, instead of ortho-aminophenyl-ortho-tolyl-ether there may be used other aryl- or aralkyl-ethers of ortho-aminophenol or a derivative thereof, such as ortho-aminophenyl-meta-tolyl ether, ortho-aminophenyl-para-tolyl ether, ortho-aminophenyl-para-chlorophenyl ether, ortho-aminophenyl-ortho-chlorophenyl ether, ortho-amino-para-chlorodiphenyl ether, ortho-aminophenyl-benzyl ether, meta-amino-paracresol-benzyl ether, 4-chloro-2-aminophenyl-benzyl ether or the like. Instead of 1-chloracetyl-amino-8-naphthol-3:6-disulphonic acid there may be used another acidyl-aroyl-1-amino-8-naphthol-disulphonic acid, such, for example, as 1-acetylamino-8-naphthol-3:6- or 4:6-disulphonic acid or benzoyl- or monochloro- or dichlorobenzoyl-1-amino-8-naphthol-3:6- or 4:6-disulphonic acid.

Example 2

A diazo-solution obtained in ordinary manner from 21.2 kilos of meta-amino-para-cresolbenzylether is introduced, while stirring, into an aqueous solution of 41.9 kilos of benzoyl-1-amino-8-naphthol-3:6-disulphonic acid and 30 kilos of crystallized sodium acetate at 0–5° C. The solution is gradually neutralized by addition of a solution of sodium carbonate. The mass becomes first slimy, whereupon the dyestuff separates out in crystalline state. After stirring for about ten hours, the mass is heated up, filtered and the solid matter dried. The obtained dyestuff constitutes a red powder which is soluble in water with blue-red and in concentrated sulphuric acid with dark blue coloration. It dyes wool and silk of very clear blue-red tints which are very fast to light and fulling.

The dyestuff of this example has in its free form probably the following formula:

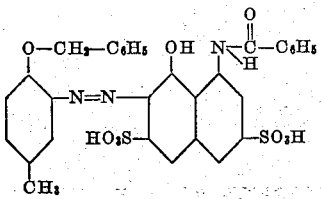

Example 3

A diazo-solution obtained in ordinary manner from 19.9 kilos of ortho-aminophenyl-ortho-tolylether is poured, while stirring, into an aqueous solution of 41.9 kilos of benzoyl-1-amino-8-naphthol-3:6-disulphonic acid and 30 kilos of crystallized sodium acetate at 0–5° C. The solution is progressively neutralized by addition of a solution of sodium carbonate. After stirring for some hours, the coupling is achieved and the whole is filtered and the solid matter dried. The obtained dyestuff constitutes a red powder which is soluble in water with blue-red and in concentrated sulphuric acid with reddish-blue coloration. It gives on wool and silk very clear blue-red tints of very good fastness to light and fulling.

The dyestuff of this example has in its free form probably the following formula:

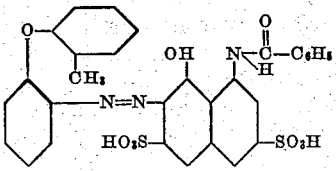

What I claim is:—

1. A process for the manufacture of monoazo-dyestuffs, consisting in coupling a diazo-compound of an ortho-aminophenol-ether of the following formula

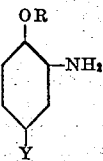

wherein R stands for phenyl of benzyl and their homologues or halogen substitution products and Y for H, Cl and $CH_3$, with an acidyl-1-amino-8-naphthol-disulphonic acid.

2. A process for the manufacture of monoazo-dyestuffs, consisting in coupling a diazo-compound of an ortho-aminophenol-phenyl-ether with an acidyl-1-amino-8-naphthol-di-sulphonic acid.

3. A process for the manufacture of monoazo-dyestuffs, consisting in coupling a diazo-compound of an ortho-aminophenol-benzyl-ether with an acidyl-1-amino-8-naphthol-disulphonic acid.

4. A process for the manufacture of monoazo-dyestuffs, consisting in coupling a diazo-compound of ortho-aminophenyl-ortho-tolyl ether with an acidyl-1-amino-8-naphthol-disulphonic acid.

5. A process for the manufacture of monoazo-dyestuffs, consisting in coupling a diazo-compound of an ortho-aminophenol-phenyl-ether with benzoyl-1-amino-8-naphthol-3:6-disulphonic acid.

6. A process for the manufacture of monoazo-dyestuffs, consisting in coupling a diazo-compound of an ortho-aminophenol-benzyl-ether with benzoyl-1-amino-8-naphthol-3:6-disulphonic acid.

7. A process for the manufacture of monoazo-dyestuffs, consisting in coupling a diazo-compound of ortho-aminophenyl-ortho-tolyl ether with benzoyl-1-amino-8-naphthol-3:6-disulphonic acid.

8. A process for the manufacture of monoazo-dyestuffs, consisting in coupling a diazo-compound of meta-amino-para-presolbenzyl-ether with benzoyl-1-amino-8-naphthol-3:6-disulphonic acid.

9. As new articles of manufacture, the monoazo-dyestuffs obtained by coupling a diazo-compound of an ortho-aminophenol-ether of the following formula

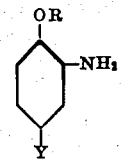

wherein R stands for phenyl or benzyl and their homologues or halogen substitution products and Y for H, Cl and $CH_3$, with an acidyl-1-amino-8-naphthol-disulphonic acid, said dyestuffs constituting red powders soluble in water to a red-blue and in concentrated sulphuric acid to a blue solution and dyeing wool and silk very clear red to blue-red shades fast to fulling and light.

10. As new articles of manufacture, the monoazo-dyestuffs obtained by coupling a diazo-compound of an ortho-aminophenol-phenyl-ether with an acidyl-1-amino-8-naphthol-disulphonic acid, said dyestuffs constituting red powders soluble in water to a red-blue and in concentrated sulphuric acid to a blue solution and dyeing wool and silk very clear red to blue-red shades fast to fulling and light.

11. As new articles of manufacture, the monoazo-dyestuffs obtained by coupling a diazo-compound of an ortho-aminophenol-benzyl-ether with an acidyl-1-amino-8-naphthol-disulphonic acid, said dyestuffs constituting red powders soluble in water to a red-blue and in concentrated sulphuric acid to a blue solution and dyeing wool and silk very clear red to blue-red shades fast to fulling and light.

12. As a new product of manufacture, the monoazo-dyestuff obtained by coupling a diazo compound of ortho-aminophenyl-ortho-tolylether with benzoyl-1-amino-8-naphthol-3:6-disulphonic acid, said dyestuffs constituting a red powder soluble in water with blue-red and in concentrated sulphuric acid with reddish-blue coloration and dyeing wool and silk very clear red to blue-red shades fast to fulling and light.

13. As a new product of manufacture, the monoazo-dyestuff obtained by coupling a diazo-compound of meta-amino-para-cresol-benzylether with benzoyl-1-amino-8-naphthol-3:6-disulphonic acid, said dyestuff constituting a red powder soluble in water with blue-red and in concentrated sulphuric acid with dark blue coloration and dyeing wool and silk of very clear blue-red tints very fast to light and fulling.

In witness whereof I have hereunto signed my name this 27th day of May, 1930.

BERNHARD RICHARD.